United States Patent
Zhang et al.

(10) Patent No.: US 8,448,205 B2
(45) Date of Patent: May 21, 2013

(54) SYSTEM AND METHOD FOR PROVIDING AVAILABLE-CHANNEL USER SELECTIVITY

(75) Inventors: Xuan Zhang, San Diego, CA (US);
Norifumi Takaya, San Diego, CA (US);
Jenny Chow, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 312 days.

(21) Appl. No.: 12/400,643

(22) Filed: Mar. 9, 2009

(65) Prior Publication Data

US 2010/0229193 A1    Sep. 9, 2010

(51) Int. Cl.
*G06F 3/00*    (2006.01)

(52) U.S. Cl.
USPC .............................................. 725/38; 725/61

(58) Field of Classification Search ...... 725/38, 725/61
See application file for complete search history.

(56) References Cited

U.S. PATENT DOCUMENTS

| | | | |
|---|---|---|---|
| 6,442,757 B1 | 8/2002 | Hancock et al. | |
| 6,766,526 B1* | 7/2004 | Ellis ................................ | 725/57 |
| 7,380,263 B2 | 5/2008 | Shintani | |
| 7,757,255 B2* | 7/2010 | Takagi et al. ................... | 725/50 |

FOREIGN PATENT DOCUMENTS

WO    WO01/28093 A1    4/2001

OTHER PUBLICATIONS

Model 8616 Addressable Home Terminal with On-Screen Display, Scientific-Atlanta, Mar. 9 , 2009 (http://www.cisco.com/en/US/prod/collateral/video/ps8611/ps8707/ps8722/product_data_sheet0900aecd806c6c54.pdf).

* cited by examiner

*Primary Examiner* — Brian Pendleton
*Assistant Examiner* — Olugbenga Idowu
(74) *Attorney, Agent, or Firm* — Fitch, Even, Tabin & Flannery LLP (57) ABSTRACT

Alternative-channel user selectivity is provided when a user tunes to a broadcast channel for which the desired broadcast station corresponding to such broadcast channel has been reassigned. In one embodiment, after tuning to broadcast channel in response to a user input, it may first be determined if in fact the desired broadcast station corresponding to the tuned broadcast channel has been reassigned. If so, one or more alternative broadcast channels corresponding to the desired broadcast station may be identified, and an alternative channel availability indicator may then be displayed to the user to provide alternative-channel user selectivity.

24 Claims, 7 Drawing Sheets

SYSTEM AND METHOD FOR PROVIDING AVAILABLE-CHANNEL USER SELECTIVITY

FIELD OF THE INVENTION

The present invention relates in general to providing television channel selectivity, and in particular to enabling a user to seamlessly select from among one or more available channels in the event of a channel allocation change by the user's broadcast content provider.

BACKGROUND

Televisions typically have the ability to perform an auto-program to search received signals in order to populate a channel map. This procedure is typically done when a television is first placed in service. Once complete, the channel map enables the television to limit the channels that are displayed or otherwise accessible to the user to only those channels that actually contain broadcast content. Users thus avoid having to scroll through blank channels.

Since detecting whether or not a channel carries broadcast content can take a couple of seconds per channel, the auto-programming process can take a significant amount of time given the vast number of television channels available today. Additionally, while the television is performing an auto-program a user is typically unable to watch any of the channels. Thus, it is desirable to avoid having to repeat the auto-programming operation in the event a broadcast content provider (e.g., cable providers, terrestrial signal providers, etc.) changes its channel allocations.

When a provider's set-top-box (STB) is used to process such reallocation of channels, the process is essentially transparent to the user since such providers are able to allocate proprietary channels that are used to communicate control information, including channel reassignment information. The provider's STB is configured to decode such information and adjust the channels as dictated by the control information prior to supplying the signals to the television. However, when non-proprietary STBs, or televisions with internal tuners are used, it is not possible to accurately decode such control information to update the channel map and, as such, the full auto-program has to be re-run in order to update the channel map. Moreover, most users will not be aware of the cause of the problem, which means that tuning to a once functional channel only to find a blank screen or unexpected programming can be both confusing and frustrating to the user. Such scenarios often result in service calls being placed to broadcast content providers' and television manufacturers' customer service centers.

As a result, there is a need in the art for a system and method for a user to be presented with and select from among multiple available channels in the event the user inadvertently tunes to a de-allocated or otherwise provider-modified channel.

BRIEF SUMMARY OF THE INVENTION

Disclosed and claimed herein are systems and methods for providing available-channel user selectivity. In one embodiment, a method includes receiving a first user tuning request corresponding to a first broadcast channel, tuning to said first broadcast channel in response to the first user tuning request, and detecting that a desired broadcast station corresponding to the first broadcast channel has been reassigned. The method further comprises identifying one or more alternative broadcast channels corresponding to the desired broadcast station, and displaying, in response said detecting, an alternative channel availability indicator to the user, wherein the alternative channel availability indicator includes channel information for the one or more alternative broadcast channels.

Other aspects, features, and techniques of the invention will be apparent to one skilled in the relevant art in view of the following detailed description of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF EXEMPLARY EMBODIMENTS

Disclosure Overview

One aspect of the present disclosure is directed to a television system and method in which available-channel selectivity is provided to a user of the television system. In particular, after tuning to a user-requested broadcast channel, a detection operation may be performed to determine if the desired broadcast station has been unexpectedly reassigned to a different channel than the selected broadcast channel. If a station identification discrepancy is in fact detected, one aspect of the invention is to then identify whether there are any alternative broadcast channels corresponding to the desired broadcast station.

Once any available alternative broadcast channels have been identified, another aspect of the invention is to then display an alternative channel availability indicator to the user. In certain embodiments, this alternative channel availability indicator may include channel information for each of the previously-identified alternative broadcast channels, or may be in the form of a selectable icon. A user may then select from among the identified alternative channels, thereby seamlessly receiving broadcast content from the desired broadcast station despite the fact that an unexpected channel reassignment has occurred. Moreover, this functionality is provided without the need to re-run an auto-program for updating the television system's channel map.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means any of the following: A; B; C; A and B; A and C; B and C; A, B and C. An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits When implemented in software, the elements of the invention are essentially the code segments to perform the necessary tasks. The code segments can be stored in a "processor readable medium," which includes any medium that can store information. Examples of the processor readable medium include an electronic circuit, a semiconductor memory device, a ROM, a flash memory or other non-volatile memory, a floppy diskette, a CD-ROM, an optical disk, a hard disk, etc.

Exemplary Embodiments

Figure 1:
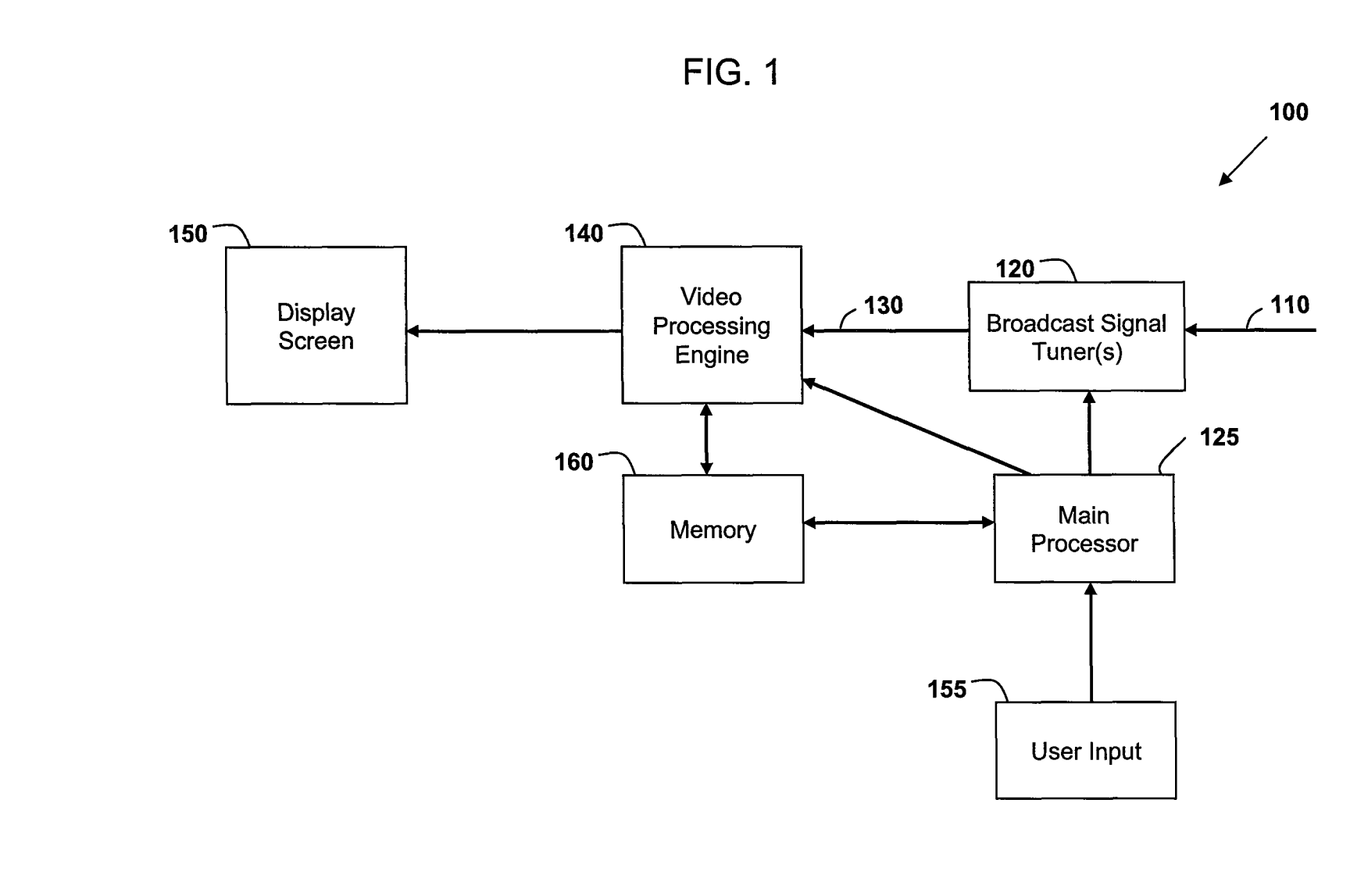
FIG. 1 depicts a television system configured to implement one or more embodiments of the invention.

FIG. 1 is a block diagram of a television system 100 capable of implementing one or more aspects of the invention, including providing available channel user selectivity. In one embodiment, television system 100 is a television system. As shown, television system 100 receives a broadcast video data signal 110, which may be in any number of video formats (e.g., National Television Standards Committee (NTSC), PAL, Digital Satellite System (DSS), Digital Broadcast System (DBS), Advanced Television Standards Committee (ATSC), etc.). The broadcast video data signal 110 may then be forwarded to one or more broadcast signal tuner(s) 120, which may be generally capable of receiving, decoding and tuning in both analog and digital signals under the direction of a main processor 125. As is generally known, television system 100 may include any number of tuners for any number of modulation schemes. Moreover, the incoming video data signal 110 may be separated into different sub-signals and provided to a corresponding one of the broadcast signal tuner(s) 120 based on their respective modulation schemes.

Tuned signal(s) 130 may then be forwarded to a video processing engine 140 for processing prior to being forwarded to a display 150 under the control of the main processor 125. As is generally known, the system 100 may further include one or more demodulators (not shown) that also demodulate the incoming video data signal 110.

Once the incoming video data signal 110 has been processed by the video processing engine 140, it may be rendered on or by the display 150, again as known in the art. It should be appreciated that the display screen 150 may correspond to any known type of display, including but not limited to cathode-ray tube, rear projection, liquid crystal display, plasma, etc.

The main processor 125 is responsive to a user input circuitry 155 to control the tuner(s) 120, video processing engine 140 and other related circuitry known in the art to be included in such television systems 100. By way of a non-limiting example, user input circuitry 155 may correspond to an infrared or radio frequency receiver for receiving user instructions from a remote control device.

During an auto-program procedure, as is typically performed when the television system 100 is first placed in use, the video processing engine 140 analyzes the tuned signal(s) to detect which of the received channels actually carry broadcast content. The identified channels are then forwarded to memory 160 and stored in the form of a channel map. This channel map is then used to correlate the user's numerical channel entry with a particular broadcast station, and to provide station-specific information, such as a channel name or its call letters (e.g., CNN™, ESPN™, etc.).

As will be described in more detail below, one aspect of the invention relates to the fact that, after tuning to a user-selected channel, the video processing engine 140 may be configured to detect whether or not the desired broadcast station corresponding to the user-selected channel has been reassigned to a different numerical channel. To that end, the video processing engine 140 may be configured to receive, decode and compare station identification information encoded in the broadcast stream of the user-selected channel with corresponding information that was previously stored in a channel map stored in memory 160, for example. A discrepancy between the station identification information encoded in the received broadcast signal and the corresponding station information from the channel map would be indicative of a channel reassignment.

Figure 2A:
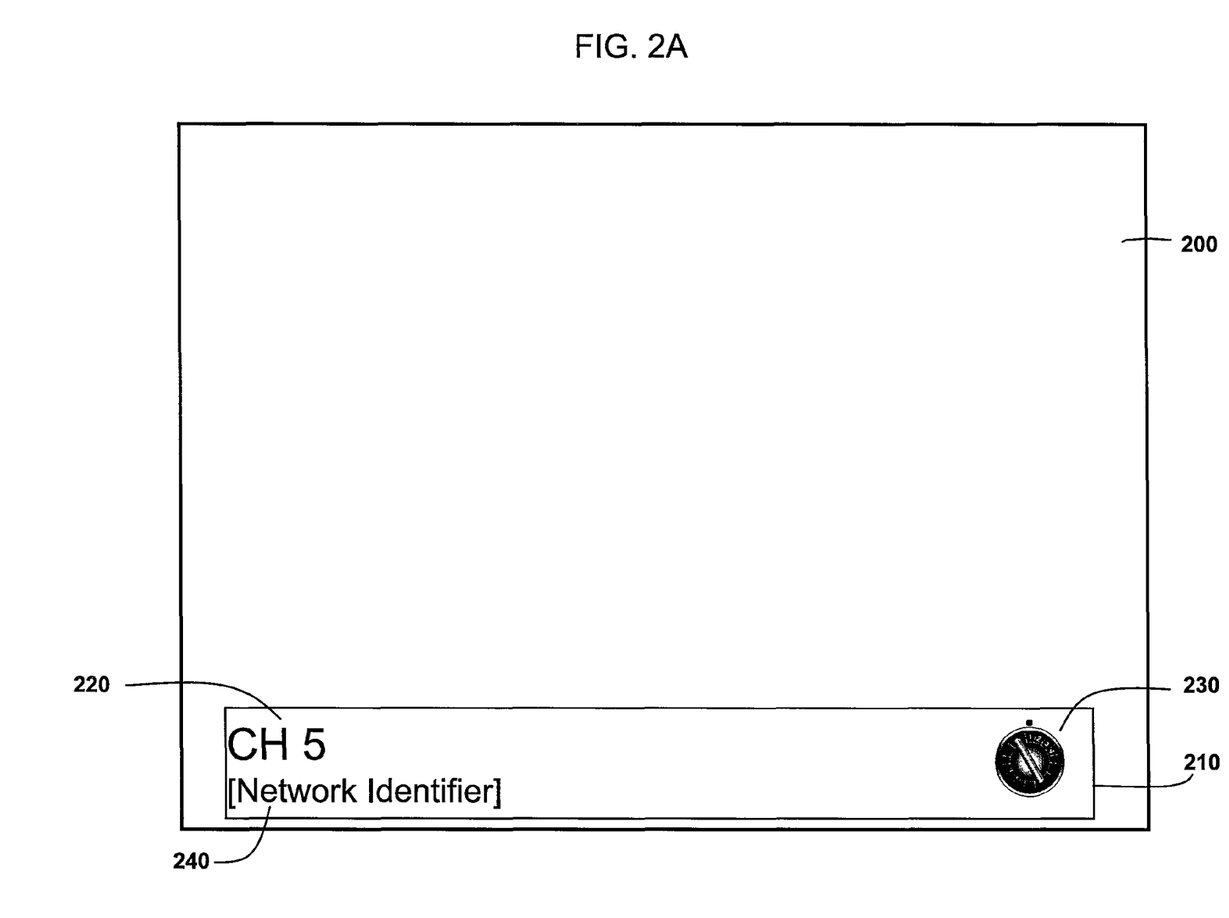
FIGS. 2A-2D depict various embodiments of display screen images based on one or more aspects of the invention.

Referring now to FIG. 2A, depicted is a typical display screen 200 of a television (e.g., television system 100) after a user has tuned to a selected channel (i.e., channel 220) for which the corresponding broadcast station has been reassigned to some other numerical channel. FIGS. 2A-2D assume that the auto-program process has been previously completed (e.g., during system setup) and that a channel map has been generated and stored locally (e.g., in memory 160).

In the embodiment of FIG. 2A, the display screen 200 is blank since the desired broadcast station has been reassigned to another channel, and no other broadcast station has yet to be assigned to the selected channel 220. Alternatively, if the selected channel 220 has in fact been assigned to another broadcast station other than the user's desired broadcast station, that broadcast station's content may be displayed instead of a blank screen. In either case, upon tuning to channel 220, a graphical banner 210 is displayed for some predetermined period of time (or indefinitely) on the television screen 200. The banner 210 may contain the current program channel 220 (i.e., CH 5), and a corresponding network identifier 240 (e.g., broadcast network call letters) for the desired broadcast station. The network identifier 240 may be based on information in the stored channel map that had been previously associated with the selected numerical channel 220.

According to one embodiment of the invention, an alternative channel availability indicator 230 may also be displayed in the banner 210, as shown, or on any other part of the screen 200. As will be described in more detail below, the alternative channel availability indicator 230 may also be displayed in response to the system detecting that the user's desired broadcast station that was previously assigned to the selected channel 220 has been reassigned to some other channel. In certain embodiments, the alternative channel availability indicator 230 may be indicative that one or more alternative broadcast channels corresponding to the desired broadcast station are available. Moreover, the alternative channel availability indicator 230 may be user selectable using any known type of user input device (e.g., remote control). It should further be appreciated that, while the indicator 230 has been graphically depicted as being a "dial" in FIG. 2A, any other graphical or text-based indicator may be similarly used in accordance with the principles of the invention.

Figure 2B:
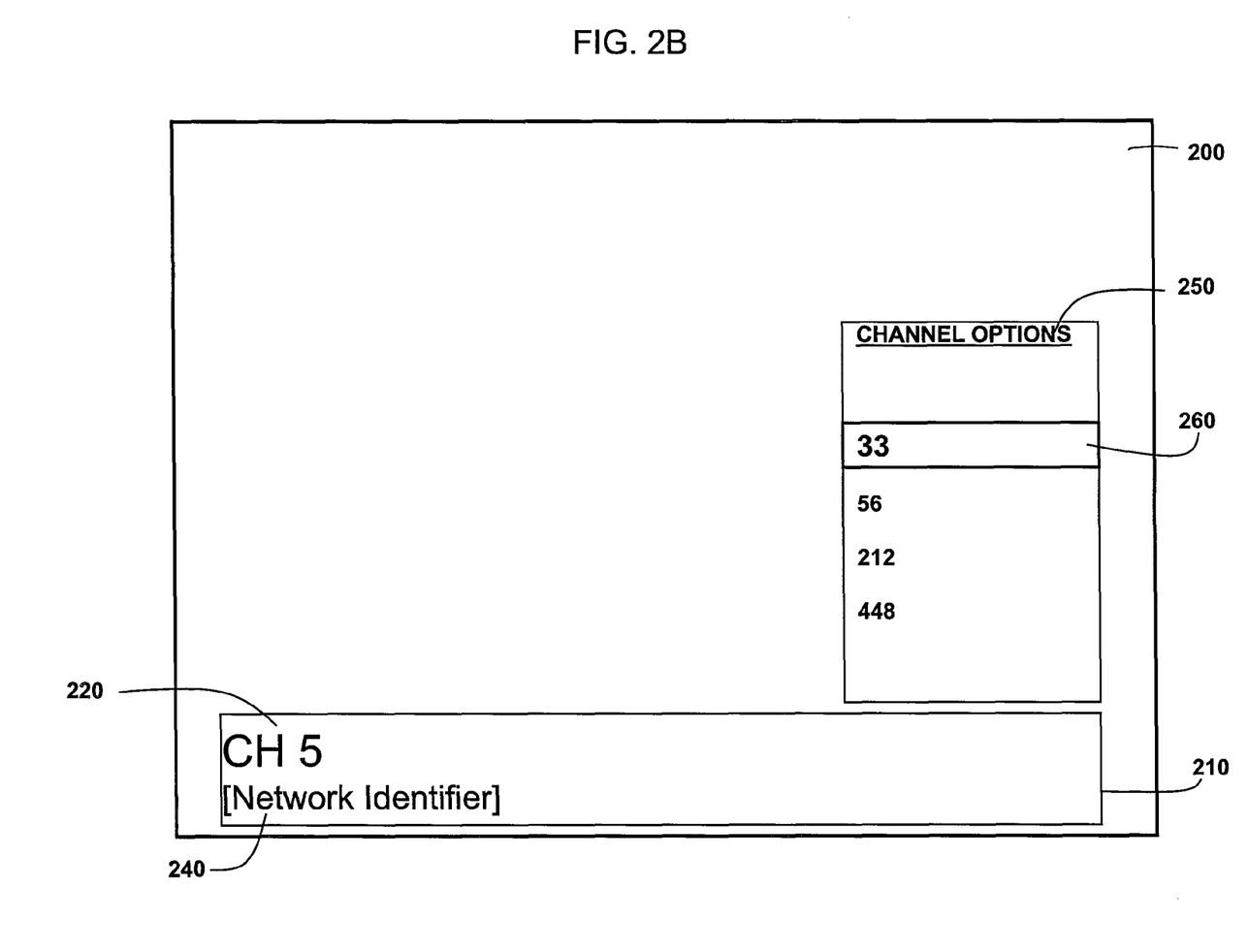

FIG. 2B depicts an exemplary embodiment of a channel option menu 250 that may be displayed on screen 200 after the user has selected the previously-displayed alternative channel availability indicator 230 of FIG. 2A. Alternatively, the channel option menu 250 may be displayed on the screen 200 in lieu of displaying indicator 230. Regardless, channel option menu 250 may contain one or more alternative broadcast channels (e.g., channels 33, 56, 212 and 448) which correspond to the desired broadcast channel that was previously, but no longer associated with the selected channel 220. In one embodiment, these alternative broadcast channels may include known virtual channels for the broadcast station in question. Moreover, where channel 220 was itself a virtual channel, the alternative broadcast channels included in the menu 250 may also include the actual physical channel associated with the user's desired broadcast station. In certain embodiments, the alternative broadcast channels may be identified by using the physical channel corresponding to the selected channel 230. That is, in order to be able to tune to the selected channel 230, the physical channel, as referenced from the channel map, needs to be tuned to. Upon tuning to that physical channel, program information may be parsed and used to identify that the channel in question has been remapped. Moreover, this collected program information may also provide the basis for determining which alternate channels are available. Alternatively, or in addition thereto, it is also possible to scan other channels referenced in Program and System Information Protocol (PSIP) data, for example, to find additional alternate channels (e.g., using information in the channel map such as the program ID). PSIP data is based on the known protocol used in the ATSC digital television standard for carrying metadata for broadcast programming.

Again using any known user input means, such as remote control, a user can navigate the menu 250 to select an alternative channel 260 (which may be a virtual channel corresponding to the desired broadcast station).

Figure 2C:
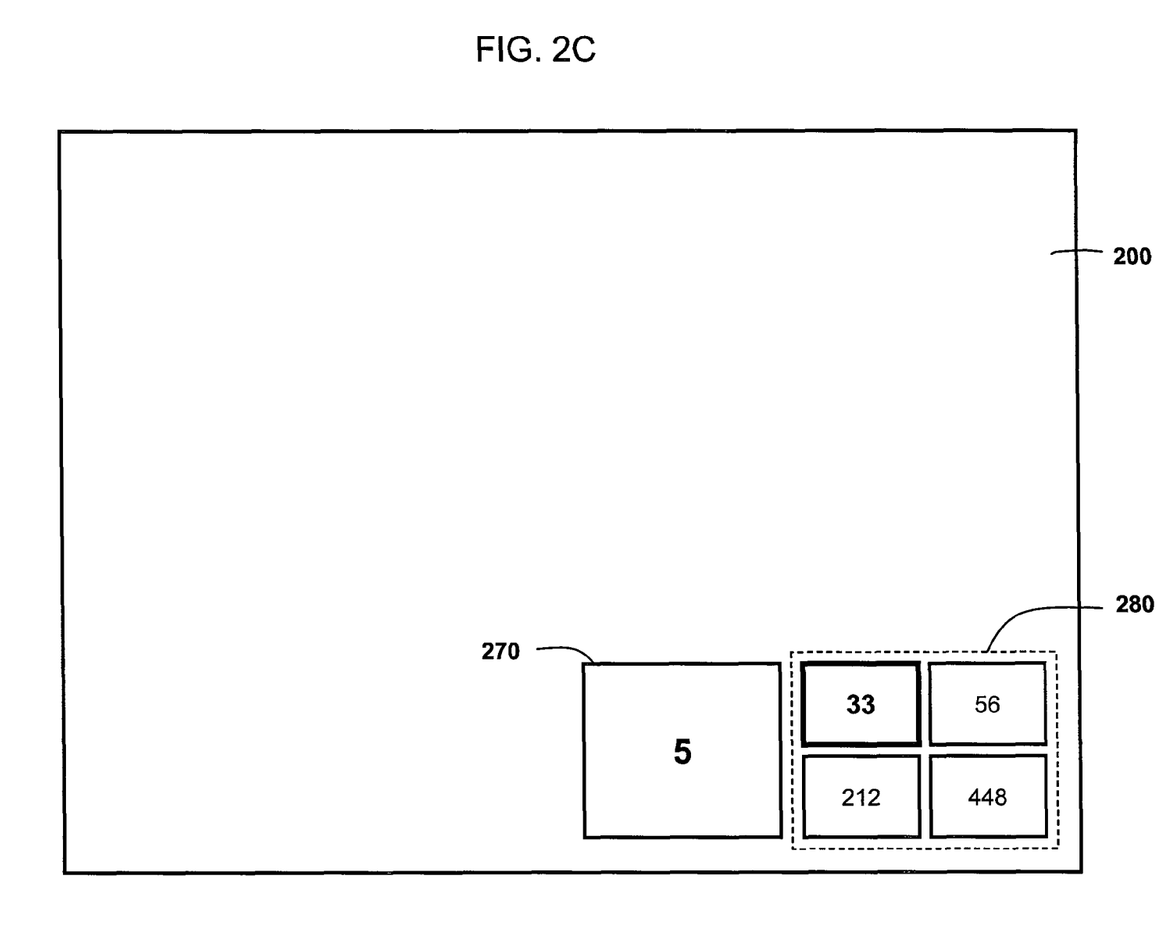

FIG. 2C depicts another embodiment of how alternative channel information may be displayed on a screen 200 when a user has tuned to a selected channel (i.e., channel 270) for which the corresponding broadcast station has been reassigned to some other numerical channel. In this embodiment, the currently-selected channel is displayed in a prominent or differentiated fashion, as selected channel 270. The identified one or more alternative broadcast channels 280 that correspond to the desired broadcast station (i.e., the station that was previously associated with the selected channel 270) may then be displayed as shown in FIG. 2C. As previously described, these alternative broadcast channels may be parsing the underlying physical channel's program information and/or scanning other channels referenced in the PSIP information (for example) to find additional alternate channels (e.g., using information in the channel map such as the program ID).

Figure 2D:
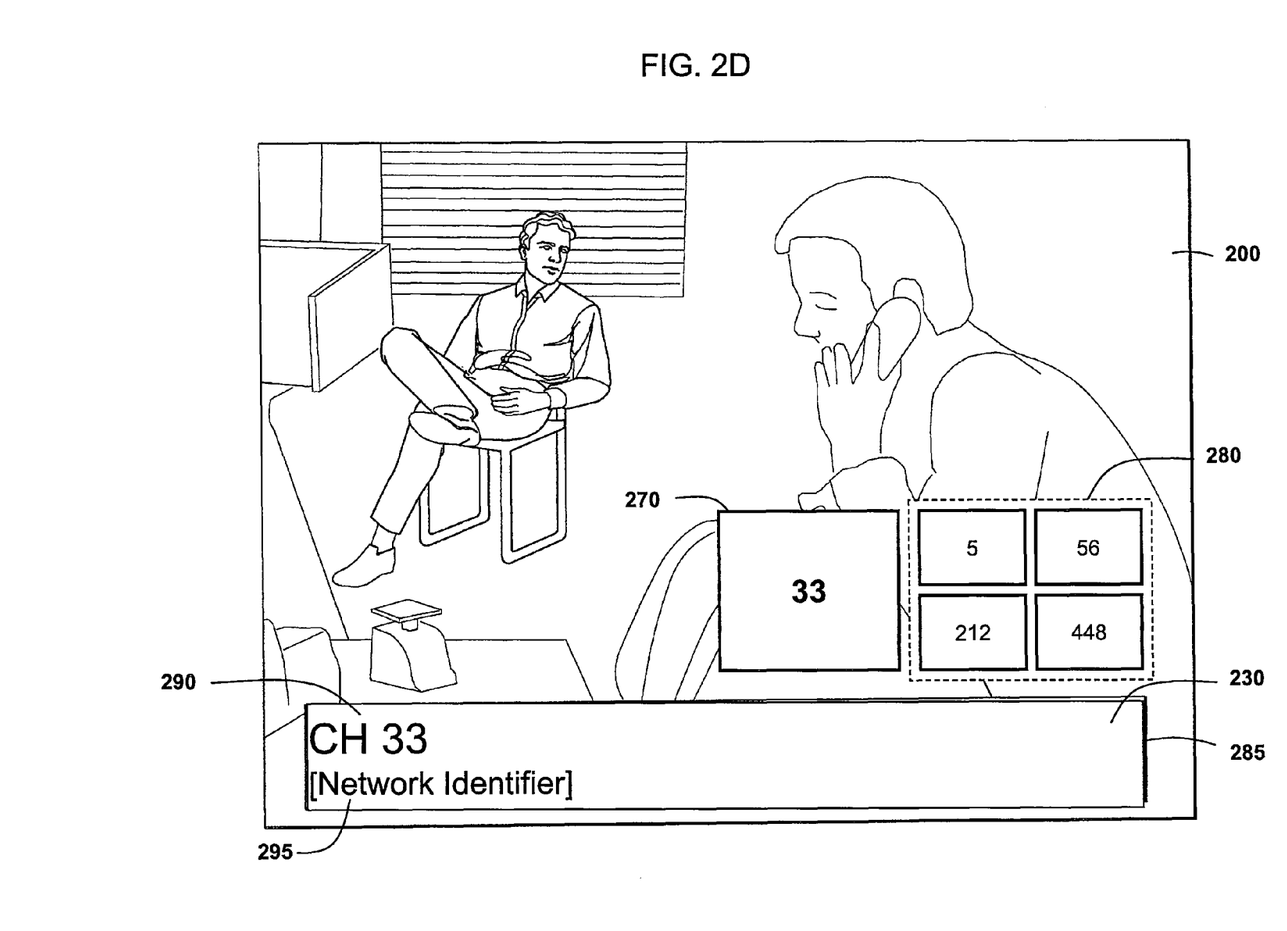

Upon receiving a user selection of one of the alternative channels 280, the system may tune to and begin displaying the broadcast content associated therewith, as shown in FIG. 2D. The graphical banner 285 may also be updated with the new selected channel 290 and its associated network identifier 295. While in the embodiment of FIG. 2D the currently selected channel 270 and the available alternative channels 280 remain displayed in order to allow the user to make further alternative channel selections, it should equally be appreciated that such channel information may be hidden upon changing channels, or after some predetermined period of time. In certain embodiments, user may call up or re-display such alternative channel information by providing a user request to that effect (e.g., selecting "info" from a remote control, etc.).

Figure 3A:
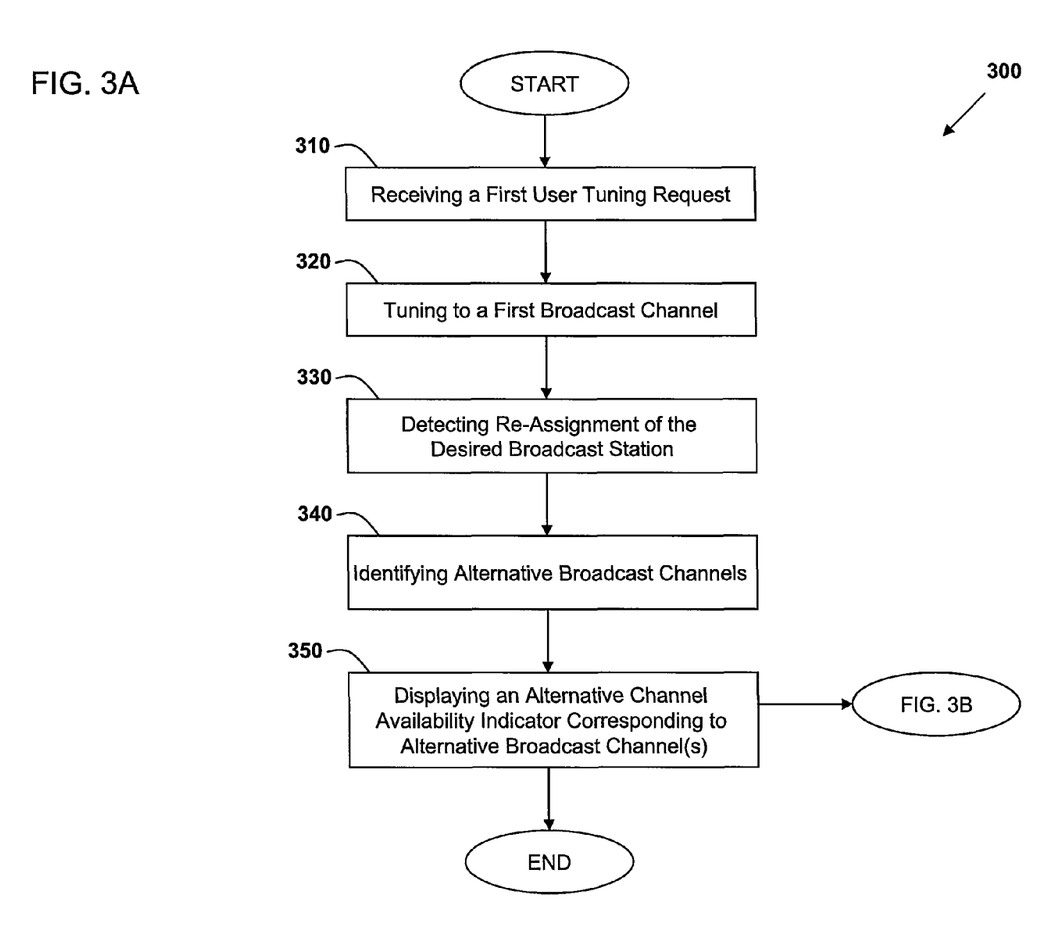
FIGS. 3A-3C depict processes for implementing one or more embodiments of the invention.

Referring now to FIG. 3A, depicted is one embodiment of a process 300 for providing available-channel selectivity to a user, in accordance with the principles of the invention. In one embodiment, process 300 may be carried out by a one or more processors (e.g., video processing engine 140 and/or main processor 125) in a television system, such as television system 100. Additionally, process 300 assumes that an auto-program process has been previously completed (e.g., during system setup) and that a channel map has been generated and stored locally (e.g., in memory 160) by the television system.

Process 300 begins at block 310 where a user tuning request corresponding to a broadcast channel is received (e.g., via user input 155), where the broadcast channel is assumed to correspond with a broadcast station the user desires to receive. It should be appreciated that this user tuning request may be provided using any known user input device, and may be in the form of an infrared, radio frequency or other wireless signal.

Process 300 may then continue to block 320 where a tuner (e.g., broadcast signal tuner 120) of the television system tunes to the selected broadcast channel based on request of block 310. However, if the desired broadcast station has been unexpectedly reassigned to a different channel than the selected broadcast channel, process 300 may detect this fact at block 330. This detection operation is described in more detail below with reference to FIG. 3C.

If a station identification discrepancy is detected at block 330, process 300 may then continue to block 340 where one or more alternative broadcast channels corresponding to the desired broadcast station may be identified. As described above, such identification is possible, in certain embodiments, by the fact that in order to be able to tune to a selected channel, the physical channel referenced in the existing channel map has to be tuned to. Upon tuning to that physical channel, program information may be collected and used to identify that the selected channel in question has been remapped, and further to identify available alternate channels in such program information.

Once the various available alternative broadcast channels have been identified, process 300 may then continue to block 350 where an alternative channel availability indicator may be displayed (e.g. on display 150) to the user. In certain embodiments, this alternative channel availability indicator may include channel information for each of the previously-identified alternative broadcast channels (e.g., channel option menu 250), or may be in the form of a selectable icon (e.g., indicator 130).

Figure 3B:
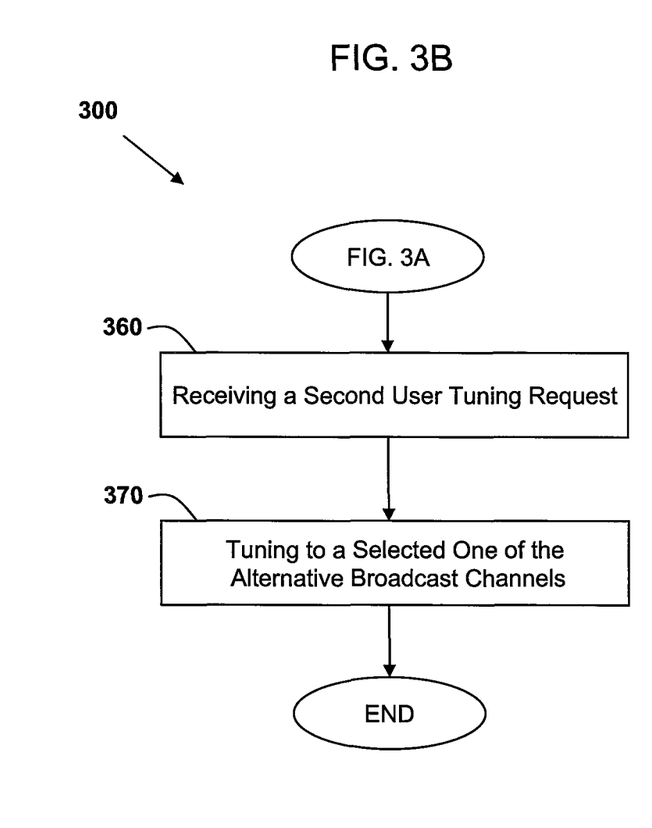

At this point, process 300 may end. However, in another embodiment, process 300 may continue to block 360 of FIG. 3B, where a second user tuning request corresponding to a user selection of the alternative channel availability indicator is received. This user selection may correspond to selecting an available virtual channel that is associated with the desired broadcast station. In any event, process 300 may then continue to block 370 where the television system may tune to a selected alternative broadcast channel in response to receiving the user request of block 360. In certain embodiments, the channel map may be automatically updated to reflect the detected reassignment. This operation may be preferably performed in the background so as to not interrupt the user's viewing experience.

Figure 3C:
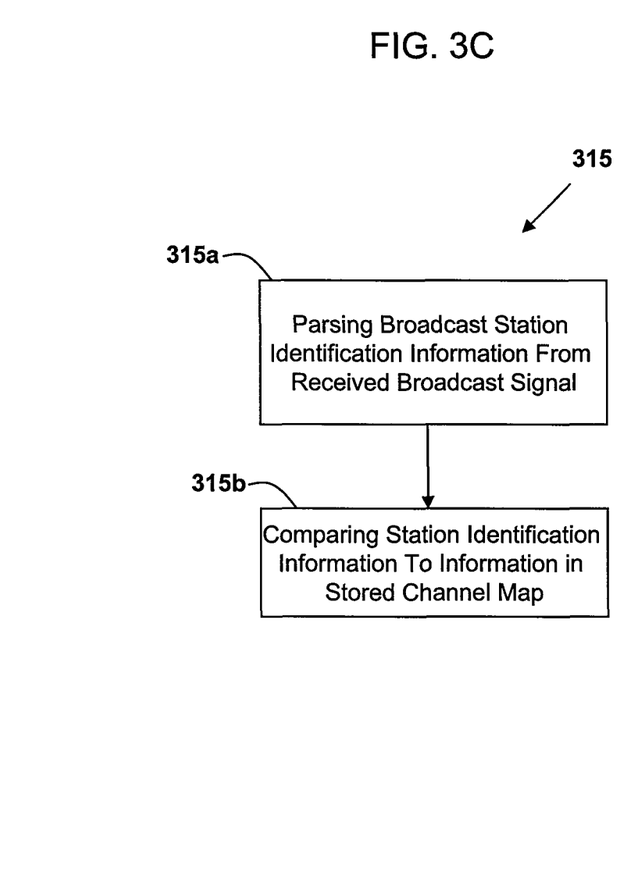

Referring now to FIG. 3C, depicted is one embodiment for how the detecting operation of block 315 of FIG. 3A may be performed. In particular, detecting a reassignment of the desired broadcast station may include parsing broadcast station identification information from the broadcast signal carrying the desired broadcast station (block 315a), and then comparing this station identification information in the broadcast signal to corresponding station information in the locally stored channel map (e.g., in memory 160) to see if there is a discrepancy (block 315b). For digital video signals, the station identification information to be parsed may be in the PSIP. In the case of analog video signals, such station identification may be contained in the vertical blanking interval (VBI) of the broadcast signal. In the context of Internet Protocol (IP)-based television, there may not be any actual channels, but rather will have various so-called "providers" of content. These content providers may provide Extensible Markup Language (XML) data & specific descriptors to identify themselves and, as such, correspond to the station identification information to be parsed.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Trademarks and copyrights referred to herein are the property of their respective owners.

What is claimed is:

1. A method for providing available-channel selectivity to a user comprising the acts of:
   receiving a first user tuning request corresponding to a first broadcast channel;
   tuning to the first user requested broadcast channel in response to the first user tuning request;
   detecting that a desired broadcast station corresponding to the first user requested broadcast channel has been reassigned;
   identifying one or more alternative broadcast channels corresponding to the reassigned desired broadcast station; and
   displaying to the user, in response to the detecting, an alternative channel availability indicator including user selectable channel information for the one or more alternative broadcast channels,
   wherein broadcast content associated with one of the one or more alternative broadcast channels is displayed after a user makes a selection using the alternative channel availability indicator.

2. The method of claim 1, wherein identifying the one or more alternative broadcast channels comprises parsing program information from a physical channel associated with the first user requested broadcast channel.

3. The method of claim 1, wherein the one or more alternative broadcast channels comprise at least one virtual channel corresponding to the desired broadcast station.

4. The method of claim 1, wherein detecting the reassignment comprises:
   parsing broadcast station identification information from a broadcast signal carrying the desired broadcast station; and
   comparing the station identification information in the broadcast signal to corresponding station information in a locally stored channel map.

5. The method of claim 4, wherein parsing broadcast station identification information comprises parsing at least one of Program and System Information Protocol (PSIP) data, vertical blanking interval data, and Extensible Markup Language (XML) data in the broadcast signal.

6. The method of claim 4, wherein the alternative channel availability indicator is displayed when the comparing identifies a discrepancy between the station identification information in the broadcast signal and the corresponding station information in the locally stored channel map.

7. The method of claim 1, further comprising receiving a second user tuning request corresponding to the user selection made using the alternative channel availability indicator.

8. The method of claim 7, further comprising tuning to one of the one or more alternative broadcast channels in response to the second user tuning request.

9. A television system for providing available-channel user selectivity comprising:
   a display screen;
   a broadcast signal tuner configured to receive broadcast programming;
   a user input; and
   a processor electrically coupled to the display screen, broadcast signal tuner and user input, the processor configured to cause the system to:
      receive a first user tuning request via the user input corresponding to a first broadcast channel;
      tune the broadcast signal tuner to the first user requested broadcast channel in response to the first user tuning request;
      detect that a desired broadcast station corresponding to the first user requested broadcast channel has been reassigned;
      identify one or more alternative broadcast channels corresponding to the reassigned desired broadcast station; and
      display to the user on the display screen, in response to detecting the reassignment, an alternative channel availability indicator including user selectable channel information for the one or more alternative broadcast channels,
   wherein the display screen displays broadcast content associated with one of the one or more alternative broadcast channels after a user makes a selection using the alternative channel availability indicator.

10. The television system of claim 9, wherein the processor is configured to identify one or more alternative broadcast channels by parsing program information from a physical channel associated with the first user requested broadcast channel.

11. The television system of claim 9, wherein the one or more alternative broadcast channels comprise at least one virtual channel corresponding to the desired broadcast station.

12. The television system of claim 9, wherein, in order to detect the reassignment, the processor is further configured to:
   parse broadcast station identification information from a broadcast signal carrying the desired broadcast station; and
   compare the station identification information in the broadcast signal to corresponding station information in a locally stored channel map.

13. The television system of claim 12, wherein the processor is configured to parse broadcast station identification information by parsing at least one of Program and System Information Protocol (PSIP) data, vertical blanking interval data, and Extensible Markup Language (XML) data in the broadcast signal.

14. The television system of claim 12, wherein the processor is configured to cause the system to display the alternative channel availability indicator when the comparison identifies a discrepancy between the station identification information in the broadcast signal and the corresponding station information in the locally stored channel map.

15. The television system of claim 9, wherein the processor is configured to cause the system to receive a second user tuning request via the user input corresponding to the user selection made using the alternative channel availability indicator.

16. The television system of claim 15, wherein the processor is further configured to tune the broadcast signal tuner to one of the one or more alternative broadcast channels in response to the second user tuning request.

17. A computer program product comprising:
a non-transitory computer storage medium having computer executable program code tangibly embodied therein to provide available-channel selectivity to a user, the computer storage medium having:
computer executable program code to receive a first user tuning request corresponding to a first broadcast channel;
computer executable program code to tune to the first user requested broadcast channel in response to the first user tuning request;
computer executable program code to detect that a desired broadcast station corresponding to the first user requested broadcast channel has been reassigned;
computer executable program code to identify one or more alternative broadcast channels corresponding to the reassigned desired broadcast station;
computer executable program code to display to the user, in response to the detecting, an alternative channel availability indicator that includes user selectable channel information for the one or more alternative broadcast channels; and
computer executable program code to display broadcast content associated with one of the one or more alternative broadcast channels after a user makes a selection using the alternative channel availability indicator.

18. The computer program product of claim 17, wherein the computer executable program code to identify the one or more alternative broadcast channels comprises computer executable program code to parse program information from a physical channel associated with the first user requested broadcast channel.

19. The computer program product of claim 17, wherein the one or more alternative broadcast channels comprise at least one virtual channel corresponding to the desired broadcast station.

20. The computer program product of claim 17, wherein the computer executable program code to detect the reassignment further includes:
computer executable program code to parse broadcast station identification information from a broadcast signal carrying the desired broadcast station; and
computer executable program code to compare the station identification information in the broadcast signal to corresponding station information in a locally stored channel map.

21. The computer program product of claim 20, wherein the computer executable program code to parse broadcast station identification information comprises computer executable program code to parse at least one of Program and System Information Protocol (PSIP) data, vertical blanking interval data, and Extensible Markup Language (XML) data in the broadcast signal.

22. The computer program product of claim 20, wherein the computer executable program code to display the alternative channel availability indicator comprises computer executable program code to display the alternative channel availability indicator the comparison identifies a discrepancy between the station identification information in the broadcast signal and the corresponding station information in the locally stored channel map.

23. The computer program product of claim 17, wherein the non-transitory computer storage medium further comprises computer executable program code to receive a second user tuning request corresponding to the user selection made using the alternative channel availability indicator.

24. The computer program product of claim 23, wherein the non-transitory computer storage medium further comprises computer executable program code to tune to one of the one or more alternative broadcast channels in response to the second user tuning request.

* * * * *

UNITED STATES PATENT AND TRADEMARK OFFICE
CERTIFICATE OF CORRECTION

PATENT NO. : 8,448,205 B2
APPLICATION NO. : 12/400643
DATED : May 21, 2013
INVENTOR(S) : Zhang et al.

It is certified that error appears in the above-identified patent and that said Letters Patent is hereby corrected as shown below:

Title page, column 2, Attorney, Agent, or Firm, line 2, delete "Flanney" and insert --Flannery--.

Signed and Sealed this
Seventeenth Day of September, 2013

Teresa Stanek Rea
*Deputy Director of the United States Patent and Trademark Office*